United States Patent [19]
Allmann et al.

[11] Patent Number: 4,620,079
[45] Date of Patent: Oct. 28, 1986

[54] STUD WELDING DEVICE

[75] Inventors: Günther Allmann, Biebertal; Hans Wiessler, Wettenberg, both of Fed. Rep. of Germany

[73] Assignee: USM Corporation, Farmington, Conn.

[21] Appl. No.: 783,735

[22] Filed: Oct. 3, 1985

[51] Int. Cl.⁴ .......................... B23K 9/00; B23K 11/04
[52] U.S. Cl. ........................................ 219/98; 219/97; 219/99; 219/137.31; 219/137.63; 219/95
[58] Field of Search .............. 219/97, 98, 136, 137.31, 219/137.63, 95, 99

[56] References Cited
U.S. PATENT DOCUMENTS 3,774,005 11/1973 Spisak ..................................... 219/98
4,529,861 7/1985 Blanton ........................... 219/137.63

FOREIGN PATENT DOCUMENTS 3105987 4/1981 Fed. Rep. of Germany .

Primary Examiner—E. A. Goldberg
Assistant Examiner—Lincoln D. Donovan
Attorney, Agent, or Firm—Aubrey C. Brine

[57] ABSTRACT

A stud welding gun has a forepart which includes the delivery end of an automatic stud-feeder and is secured to the housing by a quick releasable joint so as to be readily replaceable by another forepart supplying a stud of different size. The gun includes a pneumatic piston and piston rod which serves to push a stud into the collet after delivery to the gun. The piston rod is detachable from the piston and means is provided for locking it in the forepart so that it is replaced into the forepart for studs of different size.

8 Claims, 2 Drawing Figures

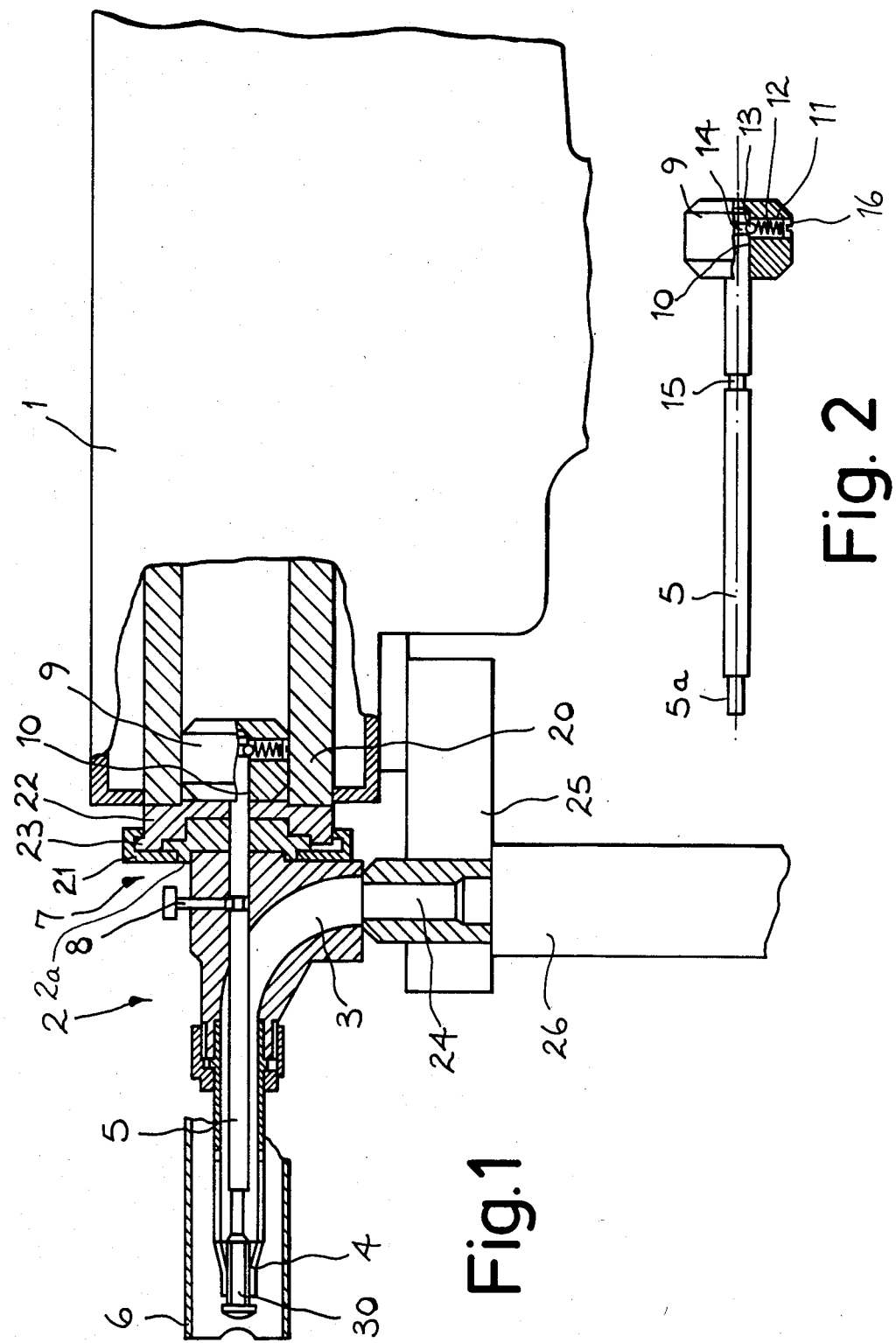

STUD WELDING DEVICE

BACKGROUND OF THE INVENTION

The present invention is concerned with a stud welding device, in particular with a stud welding gun, provided with the facility for adapting the device quickly to studs of different diameters and/or lengths.

Stud welding devices are employed in the manufacturing industry to weld studs such as T-studs and Christmas-tree studs, for example onto metallic surfaces. It happens quite often, that it is required for studs of different diameters and/or lengths to be welded onto a certain product, for example onto an automobile body. This can lead to problems, if, as is common practice on a production line, stud welding devices with automatic stud feed are used, since these have then to be adapted to suit the respective studs.

For solving this problem it has been proposed in German Publication DE-OS NO. 31 05 987 to design a welding gun such that the barrel of the gun is provided with an insert tube matching the diameter of the stud and that the length of the push rod is adapted to the length of the stud to be welded by an interchangeable spacing sleeve.

The effort involved in adapting such a stud welding gun to a stud of different diameter and different length is however relatively complicated. Not only have the insert tube and the spacing sleeve to be changed, but also the gun has to be disconnected from a stud supply means so that it can be connected to another separating and feeding attachment. If the connection to the separating and feeding attachment is not broken, then the remaining studs have to be removed from the separator for it to be re-filled with the appropriate studs to be welded. This complicated adaption procedure makes it difficult for this stud welding gun to be integrated into an extensive automated manufacturing process. This applies particularly if the stud welding device is not to be actuated manually, but is to be controlled directly by an automatic handling machine, as is common already nowadays in the automobile industry.

The object of the present invention is therefore to provide an improved stud welding device, which can be simply and quickly adapted for studs of different diameters and/or lengths and which can be used in semi or fully automated manufacturing processes in an uncomplicated and economical way.

SUMMARY OF THE INVENTION

The foregoing object is achieved in accordance with the invention by the provision of a stud welding device comprising a housing, a welding head, a stud-loading facility, a resiliently expandable collet and a reciprocable loading pin secured to a thrust piston operating in a pneumatic cylinder characterised in that the welding head is secured to the housing by means of a quick-releasable joint, and that the welding head is provided with a locking device for locking the loading pin inside the welding head, the loading pin being detachably mounted in a bore of the thrust piston, so that the welding head with the loading pin locked therein can, after releasing the joint, be removed axially from the housing.

The change-over to different size studs is thus considerably simplified with a stud welding device in accordance with the invention.

When a device in accordance with the invention is to be operated manually, for which it is normally designed in the form of a gun, the welding head can thus be detached from the housing in a simple way for another welding head to be mounted onto the housing. Advantageously, the welding heads remain thereby connected with the respective separators via the feeder tube of the loading facility, so that the interchanging of the welding heads generally requires merely a single flick of the wrist.

When using a stud welding device in according with the invention in conjunction with an automatic handling machine, the welding heads connected to the respective separators via the feeder tube are stored preferably in an appropriately designed holder (not further detailed herein). For changing the welding head the automatic handling machine controlled by an appropriate program moves together with the stud welding device with the welding head mounted thereon into the holder, where the welding head after unlocking of the joint between welding head and housing is stored away. Thereupon is picked up a new welding head from the holder. On an automatic production line one can thus arrange magazine-like several welding heads in a holder, whereby the welding heads, as stated, are connected in each case to the respective separators via their feeder tubes. The automatic handling machine is then so programmed, that if firstly picks up a first welding head for welding on the studs of one size, then changes the welding head to weld on the studs of another size.

A stud welding device in accordance with the invention can be designed so as to be simple and of low-cost construction. It can also be light in weight for the manual operation.

The quick-releasable fastening between the welding head and the housing can be achieved by a bayonet joint, known as such. In an exemplary embodiment to be preferred the forward cylinder wall of the cylinder, in which the thrust piston for actuating the loading pin is moved, is designed such that the projections required for interlocking the bayonet joint are formed directly onto the cylinder wall. The counterpart connected to the welding head bears the resemblance of a cap nut. With the remaining locking portion of the welding head being designed correspondingly allows the welding head to be rotatable around its axis relative to the housing. This facilitates on the one hand the joining together of the welding head and the housing especially when manually operated and makes it possible on the other hand for the welding head to be turned correspondingly relative to the housing for positions difficult to get at. For the automatic operation by means of a robot the bayonet plate may be provided with a latch or similar, which is actuated by the automatic handling machine when changing the head. Furthermore, the feed of the studs into the welding head for the manual operation can be rendered such that it serves at the same time as a handle, so that the welding device can be held with one hand on the gun handle and with the other hand on the welding head.

In an embodiment where the forward cylinder wall is firmly attached to the housing the thrust piston can not move out of the cylinder when the joint between housing and welding head is unlocked.

The coupling between the loading pin and the thrust piston on an exemplary embodiment to be preferred may be provided by means of a spring-loaded ball, which is provided inside the thrust piston and is pressed in radial direction into an appropriate groove of the loading pin. By selecting an appropriate spring, the initial tension of which is additionally adjustable by a small screw, the loading pin can be reliably retained inside the thrust piston during normal operation and allows it to be withdrawn from the thrust piston only when the joint is unlocked and the pin pulled firmly.

On an exemplary embodiment to be preferred the locking pin is arranged between the loading facility and the portion for locking the welding head to the housing. This arrangement leaves free an area for developing the feeding attachment and the collet, through which the studs have to be advanced, without interference from the locking device. The locking device itself may be designed in different ways. In an exemplary embodiment to be preferred it consists of a pin, which engages into an appropriate groove of the loading pin and which can be advanced and released from outside.

BRIEF DESCRIPTION OF THE DRAWING

Additional advantages, characteristic features and possible ways of employment of the present invention can be derived from the following description to be read in conjunction with the accompanying drawings, in which:

FIG. 1 shows a simplified cross-sectional view through an exemplary embodiment of the stud welding device in accordance with the invention;

FIG. 2 shows a simplified view of a loading pin to be used in conjunction with the exemplary embodiment according to FIG. 1.

DESCRIPTION OF THE PREFERRED EMBODIMENT

In FIG. 1 is shown a simplified cross-sectional view of an exemplary embodiment of a stud welding device in accordance with the invention. This stud welding device comprises a housing 1 and a welding head 2 joined thereonto. The housing 1 contains the electrical connections for the welding current supply device and the welding cycle control unit. The welding head 2 includes a tubular stud-loading facility. 3, through which the studs are pneumatically conveyed towards a resiliently expandable collet 4. A loading pin 5 inside the collect is moveable axially to advance a stud 30 into the actual welding position, in which it is shown in FIG. 1.

The construction of the collet 4 and a flash shield 6 which engages the workpiece are known in themselves and are therefore not depicted in detail in the drawings.

Locking of the loading pin 5 necessary for the removal of the welding head is effected by a locking pin 8, which is inserted from outside of the head and engages into an appropriate groove 15 of the loading pin 5. A bayonet joint 7, known per se connects the welding head 2 to the housing and comprises a bayonet plate 21 rotatable on a cylindrical portion 2a of the welding head; it engages projections 23 formed on an end wall 22 which closes the operating cylinder 20 provided by the housing. Inside this cylinder 20 is a thrust piston 9 movable to and fro pneumatically in a conventional manner and thus not depicted in the Figure in any detail.

A pneumatic feeder tube 26 is coupled with a member 24 to the loading facility 3 of the welding head. A coupling mechanism therefor is also generally known in the prior art and therefore not depicted in the Figure in any detail.

In FIG. 2 is depicted the loading pin 5 and the thrust piston 9 in conformity with the exemplary embodiment according to FIG. 1. The cylindrical loading pin 5 is provided at its forward end with a smaller diameter portion 5a being likewise cylindrical, with which the stud is pushed into the welding position. A forward annular groove 15 serves to receive the pin 8 for locking the loading pin into the welding head. To ensure retention of the loading pin 5 in an axial bore 10 of the thrust piston 9, the latter is provided with a transverse bore 11, in which a ball 13 is pressed by a spring 12 against a rearward annular groove 14 of the loading pin.

The transverse bore 11 is closed off by a screw 16, onto which bears a spring 12, so that the initial tension of the spring 12 is rendered adjustable. The initial tension in the spring 12 set such that the stresses arising during normal operation do not lead to separation of the loading pin 5 and thrust piston 9. For this purpose, the bore 10 preferably does not extend right through the thrust piston, so that the loading pin 5 can bear against the end face of this bore during the loading process. When the welding head 2 and the housing 1 are parted, the ball 13 is forced downwardly by the cylindrical shank of the loading pin 5 and releases the latter, whilst the thrust piston 9 is retained by the forward cylinder wall 22. This procedure is reversed when the welding head 2 and the housing 1 are joined up again, the thrust piston being then held in position against the forward cylinder wall by air pressure inside the cylinder 20 behind the piston.

Thus, to adapt the welding device for a different size of stud, one has merely to advance the pin 8 into the groove 15 of the pin 5 to lock them together and twist the bayonet plate 21 to release the head 2 from the housing, and replace the head by a fresh one, which may be already connected to another stud supply unit, withdrawing its locking pin 8 from the groove 15 of its loading pin 5.

We claim:

1. A stud welding device comprising a housing, a welding head, a stud-loading facility, a resiliently expandable collet and a reciprocable loading pin secured to a thrust piston operating in a pneumatic cylinder characterised in that the welding head is secured to the housing by means of a quick-releasable joint that the welding head is provided with a locking device for locking the loading pin inside the welding head the loading pin being detachably mounted in a bore of the thrust piston so that the welding head with the loading pin locked therein can, after releasing the joint be removed axially from the housing.

2. A stud welding device according to claim 1 further characterised in that the quick-releasable joint is a bayonet-type joint.

3. A stud welding device according to claim 2 further characterised in that the welding head is detachably secured to the housing by a bayonet plate in which the head is freely rotatable about the axis of the loading pin.

4. A stud welding device according to claim 1 further characterised in that the locking device is arranged between the loading facility and the quick-releasable joint.

5. A stud welding device according to claim 1 further characterised in that the locking device is formed by a pin moveable into and out of engagement with a groove of the loading pin.

6. A stud welding device according to claim 1 further characterised in that the loading pin is retained in the thrust piston by a ball which is pressed by a spring disposed in radial direction into a groove of the loading pin.

7. A stud welding device according to claim 1 further characterised in that a forward end wall of the cylinder in which said piston operates, forms part of the joint and when the head is removed remains firmly attached to the housing such that the thrust piston is retained inside the cylinder by the cylinder wall.

8. A stud welding device according to claim 7 further characterised in that the forward cylinder wall of the cylinder provides projections which are part of a bayonet joint.

* * * * *